US012162259B2

(12) United States Patent
Zhang et al.

(10) Patent No.: US 12,162,259 B2
(45) **Date of Patent: *Dec. 10, 2024**

(54) BIODEGRADABLE FOAM WITH LAMINATE LAYERS

(71) Applicant: CRUZ FOAM, INC., Santa Cruz, CA (US)

(72) Inventors: Xiaolin Zhang, San Jose, CA (US); John Felts, Santa Cruz, CA (US)

(73) Assignee: CRUZ FOAM, INC., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/612,306

(22) PCT Filed: May 22, 2020

(86) PCT No.: PCT/US2020/034361

§ 371 (c)(1),
(2) Date: Nov. 18, 2021

(87) PCT Pub. No.: WO2020/237205

PCT Pub. Date: Nov. 26, 2020

(65) Prior Publication Data

US 2022/0250349 A1 Aug. 11, 2022

Related U.S. Application Data

(60) Provisional application No. 62/851,314, filed on May 22, 2019.

(51) Int. Cl.
*B32B 5/18* (2006.01)
*B32B 3/28* (2006.01)
(Continued)

(52) U.S. Cl.
CPC .................. *B32B 5/18* (2013.01); *B32B 3/28* (2013.01); *B32B 5/02* (2013.01); *B32B 5/024* (2013.01);
(Continued)

(58) Field of Classification Search
CPC ............ B32B 2250/03; B32B 2250/40; B32B 2255/102; B32B 2255/26; B32B 2262/04;
(Continued)

(56) References Cited

U.S. PATENT DOCUMENTS 5,011,864 A 4/1991 Nielsen et al.
5,256,702 A 10/1993 Grigat et al.
(Continued)

FOREIGN PATENT DOCUMENTS

CN 1112143 A 11/1995
CN 1351951 5/2002
(Continued)

OTHER PUBLICATIONS

International Search Report and Written Opinion mailed Aug. 25, 2020, issued in corresponding International Application No. PCT/US2020/034361, filed May 22, 2020, 10 pages.
(Continued)

*Primary Examiner* — Hai Vo
(74) *Attorney, Agent, or Firm* — CHRISTENSEN O'CONNOR JOHNSON KINDNESS PLLC

(57) ABSTRACT

A composite material includes a porous foam, having a density of less than 1 g/cm$^3$, with a polymer matrix including chitosan, chitin, or chitosan oligosaccharide, and a first laminate adhered to a first surface of the porous foam.

15 Claims, 13 Drawing Sheets

COMPOSITE MATERIAL 101A

FIRST LAMINATE 105

FOAM 103

SECOND LAMINATE 107

(51) Int. Cl.

| | |
|---|---|
| ***B32B 5/02*** | (2006.01) |
| ***B32B 5/24*** | (2006.01) |
| ***B32B 7/12*** | (2006.01) |
| ***B32B 9/04*** | (2006.01) |
| ***B32B 29/00*** | (2006.01) |
| ***C08J 9/00*** | (2006.01) |
| ***C08J 9/08*** | (2006.01) |
| ***C08J 9/36*** | (2006.01) |

(52) U.S. Cl.

CPC ................ *B32B 5/245* (2013.01); *B32B 7/12* (2013.01); *B32B 9/046* (2013.01); *B32B 29/007* (2013.01); *C08J 9/0061* (2013.01); *C08J 9/08* (2013.01); *C08J 9/36* (2013.01); *B32B 2250/03* (2013.01); *B32B 2250/40* (2013.01); *B32B 2255/102* (2013.01); *B32B 2255/26* (2013.01); *B32B 2262/04* (2013.01); *B32B 2266/02* (2013.01); *B32B 2307/304* (2013.01); *B32B 2307/54* (2013.01); *B32B 2307/7163* (2013.01); *B32B 2307/72* (2013.01); *B32B 2439/62* (2013.01); *B32B 2439/70* (2013.01); *B32B 2439/80* (2013.01); *C08J 2203/02* (2013.01); *C08J 2305/08* (2013.01); *C08J 2401/02* (2013.01); *C08J 2403/02* (2013.01); *C08J 2405/08* (2013.01)

(58) Field of Classification Search

CPC .......... B32B 2264/104; B32B 2266/02; B32B 2307/304; B32B 2307/54; B32B 2307/7163; B32B 2307/72; B32B 2439/62; B32B 2439/70; B32B 2439/80; B32B 29/007; B32B 3/28; B32B 3/30; B32B 5/02; B32B 5/024; B32B 5/18; B32B 5/245; B32B 7/12; B32B 9/02; B32B 9/046; C08J 2203/02; C08J 2305/08; C08J 2401/02; C08J 2403/02; C08J 2405/08; C08J 9/0061; C08J 9/08; C08J 9/36

See application file for complete search history.

(56) References Cited

U.S. PATENT DOCUMENTS

| | | | | |
|---|---|---|---|---|
| 5,756,111 | A | 5/1998 | Yoshikawa et al. | |
| 6,221,924 | B1 | 4/2001 | Mori et al. | |
| 7,041,369 | B1 | 5/2006 | Mackay et al. | |
| 8,114,919 | B2 | 2/2012 | Weidinger | |
| 2001/0041702 | A1 | 8/2001 | Harfmann et al. | |
| 2003/0021921 | A1 | 1/2003 | Debraal et al. | |
| 2003/0143388 | A1 | 7/2003 | Reeves et al. | |
| 2003/0155679 | A1 | 8/2003 | Reeves et al. | |
| 2004/0197545 | A1 | 10/2004 | Gehlsen et al. | |
| 2005/0202229 | A1 | 9/2005 | Ozasa et al. | |
| 2006/0293418 | A1 | 12/2006 | Matuana et al. | |
| 2007/0292643 | A1 | 12/2007 | Renn | |
| 2009/0214853 | A1 | 8/2009 | Quist et al. | |
| 2009/0263601 | A1 | 10/2009 | Renn | |
| 2009/0324913 | A1 | 12/2009 | Bastioli et al. | |
| 2011/0059162 | A1 | 3/2011 | Reed et al. | |
| 2011/0274726 | A1* | 11/2011 | Guo | A61L 15/425 264/28 |
| 2012/0024306 | A1 | 2/2012 | Mishra et al. | |
| 2012/0053261 | A1* | 3/2012 | Pravata | C09J 105/08 523/118 |
| 2012/0077012 | A1 | 3/2012 | Liu et al. | |
| 2012/0235090 | A1 | 9/2012 | Maeda et al. | |
| 2013/0287836 | A1 | 10/2013 | Ingber et al. | |
| 2014/0219962 | A1 | 8/2014 | Zhang et al. | |
| 2014/0256925 | A1 | 9/2014 | Catchmark et al. | |
| 2014/0371354 | A1 | 12/2014 | Evans et al. | |
| 2015/0057368 | A1 | 2/2015 | Connelly et al. | |
| 2015/0299383 | A1 | 10/2015 | Trumbo et al. | |
| 2015/0374877 | A1 | 12/2015 | Guo et al. | |
| 2016/0168311 | A1 | 6/2016 | Cuero Rengifo et al. | |
| 2016/0207251 | A1 | 7/2016 | Cik | |
| 2018/0361011 | A1* | 12/2018 | Norowski, Jr. | A61L 15/28 |
| 2020/0107966 | A1* | 4/2020 | Francis | A61F 13/0266 |
| 2020/0239670 | A1 | 7/2020 | Rolandi et al. | |
| 2021/0238393 | A1* | 8/2021 | Zhang | C08L 5/08 |

FOREIGN PATENT DOCUMENTS

| | | | |
|---|---|---|---|
| CN | 1410452 | | 4/2003 |
| CN | 1587306 | | 3/2005 |
| CN | 1628865 | A | 6/2005 |
| CN | 1800249 | A | 7/2006 |
| CN | 101381500 | | 3/2009 |
| CN | 101974189 | | 2/2011 |
| CN | 101654537 | | 3/2011 |
| CN | 101301491 | B | 6/2011 |
| CN | 103012836 | | 4/2013 |
| CN | 103709452 | A | 4/2014 |
| CN | 104558677 | | 4/2015 |
| EP | 0747420 | A1 | 12/1996 |
| JP | 6390507 | A | 4/1988 |
| JP | 0565359 | | 3/1993 |
| KR | 960004436 | B1 | 6/1993 |
| WO | 2012/030805 | A2 | 3/2012 |
| WO | 2013/131079 | A1 | 9/2013 |
| WO | 2018017837 | | 1/2018 |
| WO | 2019/217268 | A1 | 11/2019 |
| WO | 2020237205 | A1 | 11/2020 |
| WO | 2021086787 | A1 | 5/2021 |

OTHER PUBLICATIONS

First Chinese Office Action with English translation, issued Dec. 25, 2021, in corresponding Chinese Patent Application No. 201980030829.7, 21 pages.

Second Chinese Office Action with English translation, issued Jun. 22, 2022, in corresponding Chinese Patent Application No. 201980030829.7, 12 pages.

Chinese Rejection Decision, with English translation, issued Nov. 14, 2022, in corresponding Chinese Patent Application No. 201980030829.7, 10 pages.

Third Chinese Office Action with English translation, issued Mar. 17, 2023, in corresponding Chinese Patent Application No. 201980030829.7, 13 pages.

EP Search Report issued Feb. 10, 2022, in corresponding European Patent Application No. 19800604.1, 7 pages.

Emilia Szymańska, et al., Stability of Chitosan-A Challenge for Pharmaceutical and Biomedical Applications, Marine Drugs, Published Apr. 1, 2015, vol. 13, pp. 1819-1846.

Duan, Jiufang, "Natural Macromolecules" (Chinese), Huazhong University of Science and Technology Press, Edition 1, p. 182, published on Mar. 31, 2016.

Beijing Plastic Industry School, China Light Industry Press, "Plastic Molding Equipment 1st edition," Aug. 31, 2007, op. 1-4.

ASTM Int'l Standard Designation: D1621-10, "Standard Test Method for Compressive Properties of Rigid Cellular Plastics," Apr. 2010, 5 pages.

ASTM Int'l Standard Designation: D1622/D1622M-14, "Standard Test Method for Apparent Density of Rigid Cellular Plastics," Apr. 2014, 4 pages.

ASTM Int'l Standard Designation: D1623-09, "Standard Test Method for Tensile and Tensile Adhesion Properties of Rigid Cellular Plastics," Sep. 2009, 7 pages.

ASTM Int'l Standard Designation: D3575-20, "Standard Test Methods for Flexible Cellular Materials Made from Olegin Polymers," Feb. 2020, 11 pages.

ASTM Int'l Standard Designation: D3576-15, "Standard Test Method for Cell Size of Rigid Cellular Plastics," Oct. 2015, 5 pages.

ASTM Int'l Standard Designation: D6226-15, "Standard Test Method for Open Cell Content of Rigid Cellular Plastics," Sep. 2015, 7 pages.

(56) References Cited

OTHER PUBLICATIONS

Banerjee et al., "Alginate-chitosan composite hydrogel film with macrovoids in the inner layer for biomedical applications," J Appl. Polym. Sci., Jun. 10, 2019, 9 pages.
Calles-Arriaga, et al., "Thermal Characterization of Microwave Assisted Foaming of Expandable Polystyrene," Ingenieria Investigacion y Tecnologia. Jan. 2016, 7 pages.
Castel-Molieres et al., "Influence of Homogenization Technique and Blend Ratio on Chitosan/Alginate Polyelectrolyte Complex Properties," Journal of Medicine and Biological Engineering, vol. 38(1); Feb. 2018, pp. 10-21.
Flagel, "Mycelium: Using Mushrooms to Make Packaging Materials," https://matmatch.com/blog, Apr. 3, 2020, 21 pages.
Makarios-Laham, et al., Biodegradability of Chitin- and Chitosan-Containing Films in Soil Environment, Journal of Environmental Polymer Degradation vol. 3,(1), Jan. 1995, 6 pages.
Mohandas et al., "Exploration of alginate hydrogel/nano zinc oxide composite bandages for infected wounds" International Journal of Nanomedicine, Oct. 2015, pp. 53-66.
PCT/US2019/030832—International Search Report and Written Opinion dated Aug. 23, 2019, 13 pages.
PCT/US2020/057373—International Search Report and Written Opinion dated Mar. 3, 2021, 13 pages.
Ping Li et al., "Chitosan-Alginate Nanoparticles as a Novel Drug Delivery System for Nifedipine," International Journal of Biomedical Science, vol. 4, (3), Sep. 2008, pp. 221-228.
Rudyardjo, et al., "The synthesis and characterization of hydrogel chitosan-alginate with the addition of plasticizer lauric acid for wound dressing application," Journal of Physics: Conference Series 853 (2017) 012042, IOP Publishing 8 pages.
Shigemasa, et al. "Evaluation of different absorbance ratios from infrared spectroscopy for analyzing the degree of deacetylation in chitin," International Journal of Biological Macromolecules, 18(3), Apr. 1996, 237-42.
Zhao et al., "Preparation of Fibrous Chitosan/Sodium Alginate Composite Foams for the Absorption of Cationic and Anionic Dyes," Journal of Hazardous Materials vol. 403, Sep. 2020, pp. 1-10.
Zong Chengzhong et al., "900 Cases of Plastic Formulation Design and Application", China Petrochemical Press, Dec. 12, 2002, pp. 278-280.
Chinese Rejection Decision, with English Translation, issued Jun. 27, 2023, in corresponding Chinese Patent Application No. 201980030829.7, 14 pages.
US Office Action issued Jul. 3, 2023, in corresponding U.S. Appl. No. 17/612,306, 16 pages.
US Office Action issued Aug. 16, 2023, in corresponding U.S. Appl. No. 17/049,170, 6 pages.
PCT/US2020/057373—Invitation to Pay Additional Fees and, Where Applicable, Protest Fee dated Dec. 29, 2020, 2 pages.
International Search Report and Written Opinion mailed Aug. 25, 2020, issued in International Application No. PCT/US2020/034361, filed May 22, 2020, 9 pages.
Aimin, Biodegradable Starch Based Foaming Composition, Jul. 12, 2006, machine translation of CN 1800249 (Year: 2006).
US Office Action issued Oct. 11, 2023, in corresponding U.S. Appl. No. 17/049,170, 12 pages.
Final Office Action mailed Apr. 17, 2024, issued in corresponding U.S. Appl. No. 17/049,170, filed Oct. 20, 2020, 22 pages.
Non-Final Office Action issued Jul. 2, 2024, in corresponding U.S. Appl. No. 17/773,514, filed Apr. 29, 2022, 38 pages.

* cited by examiner

1200

| Source/Material | | | Density | Compressive Strength (10% deformation) | Elastic Modulus |
|---|---|---|---|---|---|
| | | | $g/cm^3$ | Mpa | Mpa |
| Organic Foam | No Plasticizer | | 0.150 | 0.200 | 4.230 |
| | | | 0.230 | 0.480 | 6.550 |
| | With Plasticizer | 0.25 vol% | 0.200 | 0.170 | 3.400 |
| | | 1 vol% | 0.270 | 0.106 | 2.010 |

FIG. 12

BIODEGRADABLE FOAM WITH LAMINATE LAYERS

CROSS-REFERENCE TO RELATED APPLICATIONS

This application is a US national stage (371) of PCT/US2020/034361, filed 22 May 2020, which application claims the benefit of U.S. Provisional Application No. 62/851,314, filed 22 May 2019, which applications are hereby incorporated by reference.

TECHNICAL FIELD

This disclosure relates generally to foam.

BACKGROUND INFORMATION

Petroleum-based plastic foam is ubiquitous in modern society: it is used for packaging, flotation, and the like. However, petroleum-based plastic foam suffers from many drawbacks. For example, the ocean has become filled with petroleum-based foam waste. This is because many petroleum-based foams, such as polystyrene foam take 500 years or more to decompose. Moreover, petroleum-based plastic foams are either entirely non-recyclable (because of their chemical composition) or not economically viable for recycling due to the low material content of the foam: petroleum-based foams are mostly air Petroleum-based foams tend to be toxic or made by toxic processes. Although petroleum-based foams resist decomposition, when the foams do decompose, they can result in the release of toxic compounds into the environment (e.g., degraded monomer units of the foam). Furthermore, polystyrene and other petroleum-based foams) is made using toxic chemicals such as benzene and styrene, which have been shown to be carcinogenic and slowly leach into the environment and food products in contact with the foam.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 12 shows a table of measured foam properties, in accordance with an embodiment of the disclosure.

DETAILED DESCRIPTION

Embodiments of biodegradable composites which include laminated foams, laminated foam devices, and systems, apparatuses, and methods for producing biodegradable laminated foams are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification "to one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As stated above, petroleum-based foams suffer from many drawbacks. Described herein are biodegradable foam composites, biodegradable foam devices, and systems, apparatuses, and methods for producing the biodegradable foam composites that solve the problems associated with conventional petroleum-based foams. The foam composites described here are biodegradable, nontoxic, and produced with nontoxic precursors and through environmentally friendly processes. As will be shown, these biodegradable foam composites represent a significant advancement over existing industrial foam technologies since the biodegradable foams and their composites have similar or better mechanical, chemical, and thermal properties than the petroleum-based foams, with none of the negative environmental impact.

Figure 1A:
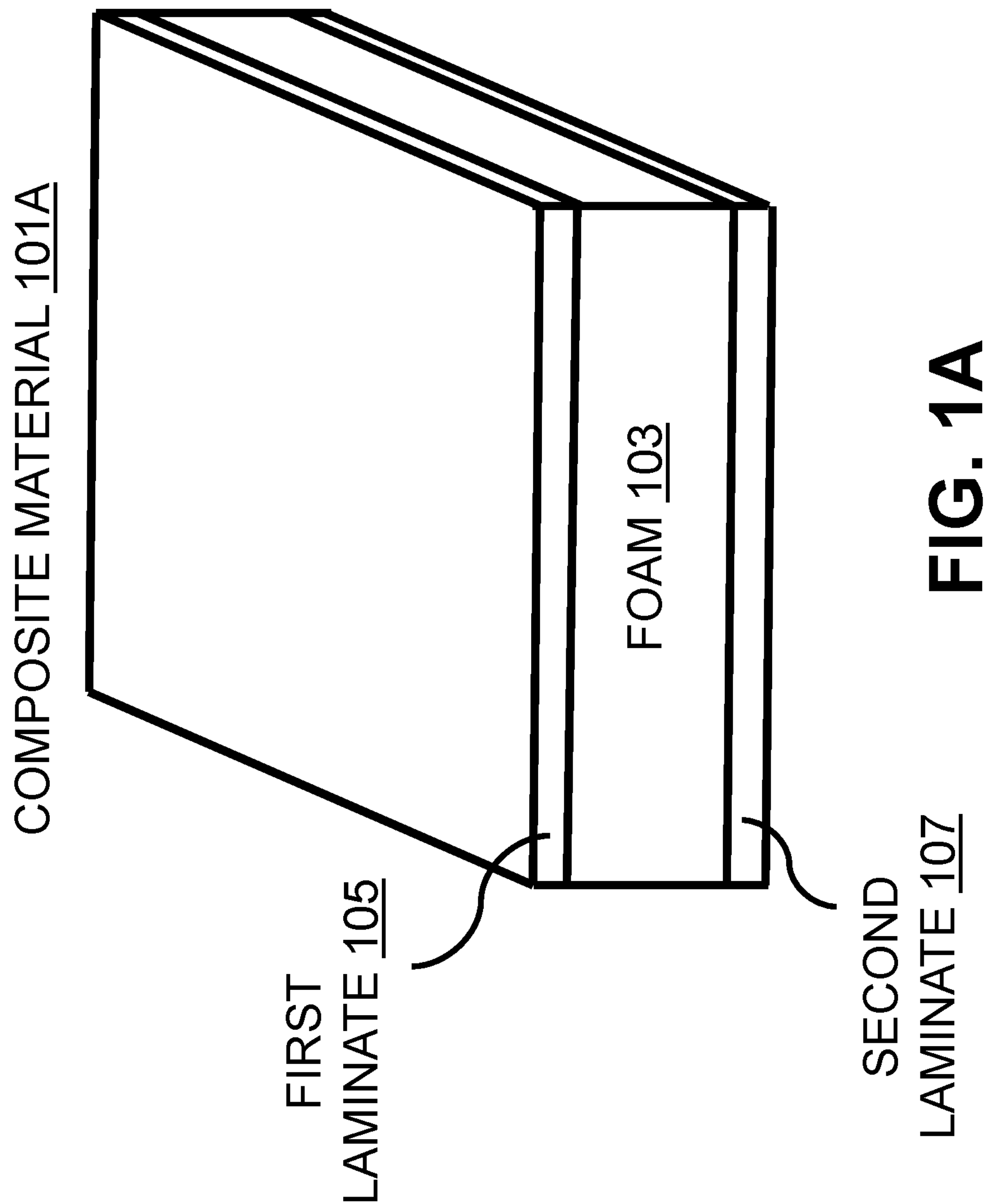
FIG. 1A illustrates a composite material with a foam center and laminates disposed on either side of the foam, in accordance with an embodiment of the disclosure.

FIG. 1A illustrates a composite material 101A with foam 103 center and laminates (including first laminate 105 and second laminate 107) disposed on either side of foam 103, in accordance with an embodiment of the disclosure. In some embodiments, foam 103 is porous. In some embodiments the laminates are biodegradable. In some embodiments, the laminates comprise one or more of paper (cellulose fiber) and natural fiber textiles.

In the depicted embodiment, composite material 101A includes tram 103 sheet in the center of composite 101A with one or more laminate layers (e.g., first laminate 105 and second laminate 107) adhered a first side and a second side (opposite the first side) of foam 103. In some embodiments, only one side of foam 103 may be adhered to a laminate (e.g., first laminate 105), and the other sides may be exposed foam 103. However, in other embodiments, as many as all aides of foam 103 may be covered with laminate (see e.g., FIG. 1B). Foam 103 may have a single composition or may include multiple layers of foam 103 with different compositions that are attached/adhered together. Similarly, one or more layers of laminates, with different material compositions, can be applied to either or both sides of foam 103 in any order. In the depicted embodiment, the center piece foam 103 may be approximately 1-4 mm thick; however, in other embodiments, foam 104 may have any thickness and shape. For example, foam 103 may not necessary be planar, and make take other shapes, in accordance with the teachings of the present disclosure.

As will be discussed in greater detail later, in some embodiments, foam 103 may itself be a composite (e.g., a material made from two or more constituent materials) that includes a matrix polymer (e.g., one or more of chitosan, chitin, and chitosan oligosaccharide) and a dispersed phase. However, in other embodiments, the foam may be made from just the matrix polymer. The matrix polymer may include monomer units of D-glucosamine and N-acetyl-D-glucosamine. In the depicted embodiment, the matrix polymer may include 70% or less N-acetyl-1-D-glucosamine; however in other embodiments, the matrix polymer may include 60% or less N-acetyl-D-glucosamine, 50% or less N-acetyl-D-glucosamine; 40% or less N-acetyl-D-glucosamine, 30% or less N-acetyl-D-glucosamine, 20% or less N-acetyl-D-glucosamine, or 10% or less N-acetyl-D-glucosamine. As stated, a dispersed phase may be disposed in the matrix polymer, and the dispersed phase and the matrix polymer form porous composite foam. In the depicted embodiment, porous composite foam 103 includes, by weight. 0.5-3 times the dispersed phase to the matrix polymer and has a density of less than 1 g/cm3.

In some embodiments, the dispersed phase is biodegradable. In some embodiments, the dispersed phase includes at least one of chitin, starch, or cellulose. More specifically, examples of dispersed phases may include at least one of (unprocessed or minimally processed) shellfish shells, wood flour, hemp, paper pulp (e.g., including broken down recycled paper), coconut husks, cornstarch, or tapioca powder, or the like. It is appreciated that foam 103, has been made with all of the aforementioned dispersed phases, and that the dispersed phases are not mutually exclusive (the dispersed phases can be used individually and in combination). For example, all of the dispersed phases mentioned above may be combined in the same piece of composite foam, or only some of the dispersed phases may be included in the same piece of composite foam. In some embodiments, a nontoxic (e.g., safe for human consumption, safe for human skin contact, not generally regarded as carcinogenic, or the like) plasticizer may be disposed in the matrix material to impart a flexible character to the porous composite foam, Thus, organic composite foam sample may be deformed (e.g., compressed, bent, stretched, or the like) and return to its original form without breaking. In some embodiments, the nontoxic plasticizer may include low molecular weight polymers, polyols, alcohols, or the like. In some embodiments, the foam may include salt (e.g., calcium and sodium salts).

In some embodiments, the laminate material (e.g., first laminate 105 and second laminate 107) may include at least one of cellulose fiber (e.g., paper, linerboard), chitin/chitosan, wax, natural fiber fabric any woven or cloth material), and/or other biocompatible materials that can serve as a skin-like layer adhered to foam 103. These laminate materials are not mutually exclusive and can be combined in one or more layers in the same embodiments. Laminate layers 105/107 can be applied to either or both sides of foam 103. Laminates 105/107 may serve as a barrier layer between foam 103 and a product to be packaged (e.g., food, or the like). Laminates 105/107 may improve the properties of the underling foam 103 when used to form composite 101A. Laminates 105/107 may result in functional improvements water resistivity), aesthetic improvements (e.g., smoother surface and more appealing color), compliance with food safety regulation requirements, and compliance with other possible packaging concerns (e.g., UV barrier, CO2 barrier, O2 barrier, etc.). Furthermore, depending on the end applications and functional performance parameters that composite 101A needs to meet, a combination of one or more layers of laminate materials can be attached to either or both sides of foam 103 in any order. There are a wide array of uses for composite 101A such as trays; plates, cups, clam shells, boxes with direct food contact, packaging trays, boxes for packaging needs, a full packaging box that does not require an overbox (e.g., FIG. 10), or the like.

Depending on the composition of laminate material 105/107 and material composition of foam 103, an adhesive between foam 103 and laminate 105/107 may be a chitin/chitosan solution (e.g., 1-10 wt % chitosan dissolved in acetic acid solution (pH 3-6)), the foam itself (e.g., laminates 105/107 are stuck to foam 103 when it is wet or liquid), wood glue, or other biocompatible glue. The adhesive may be applied via brushing, spraying, dip coating; etc., with or without the assistance of steam. The adhesive is biodegradable in some embodiments.

Figure 1B:
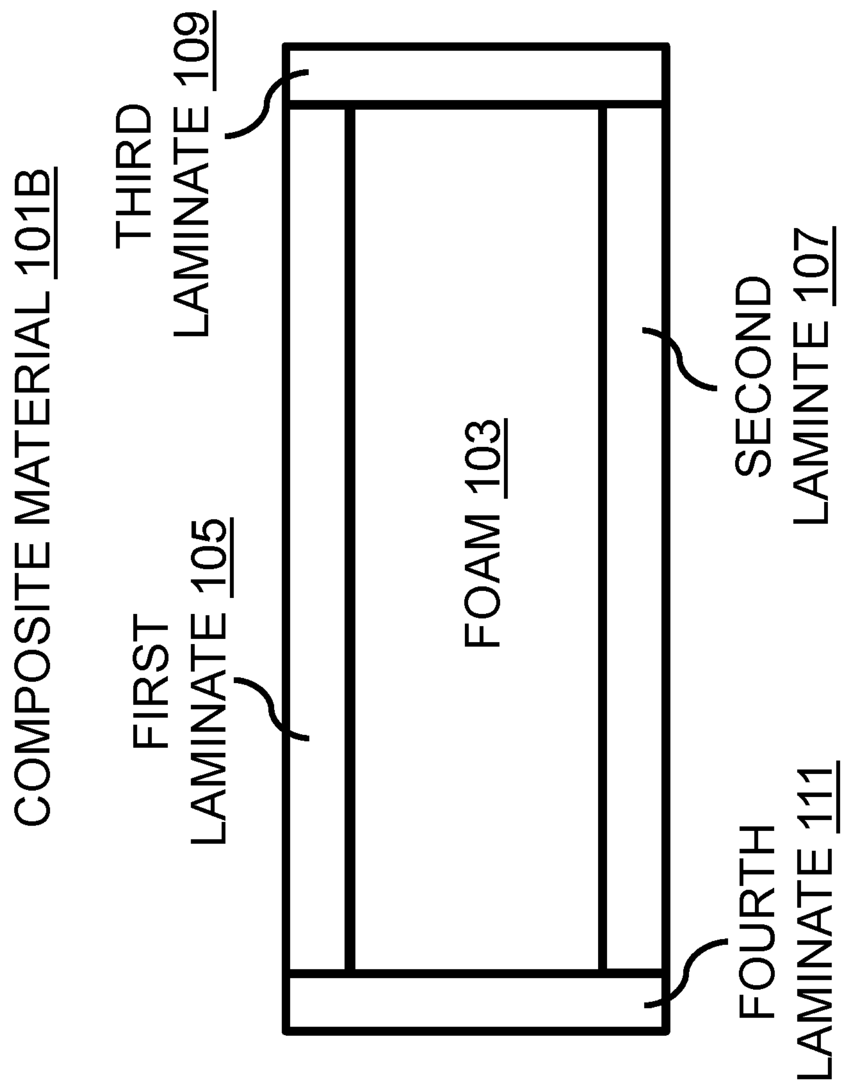
FIG. 1B illustrates a composite material with a foam center and laminates disposed on either side of the foam, in accordance with an embodiment of the disclosure.

FIG. 1B illustrates a composite material 101B with foam 103 center and laminates 105-109 disposed on all sides of the foam, in accordance with an embodiment of the disclosure. FIG. 1B is the same as FIG. 1A; however, composite material 101B has two additional sides of foam 103 covered with third laminate 109 and fourth laminate 111. In the depicted example, composite material 101B is shaped substantially as a sheet, having edges, with third laminate 109 and fourth laminate 11 adhered to one or more edges of foam 103 to fully encapsulate foam 103. A laminate can be characterized as one or more layers of forming a skin layer adhered to the foam. The lamination material can be fibrous, such as cellulose fiber and other natural fibers, as in examples described herein, and biodegradable.

Figure 2:
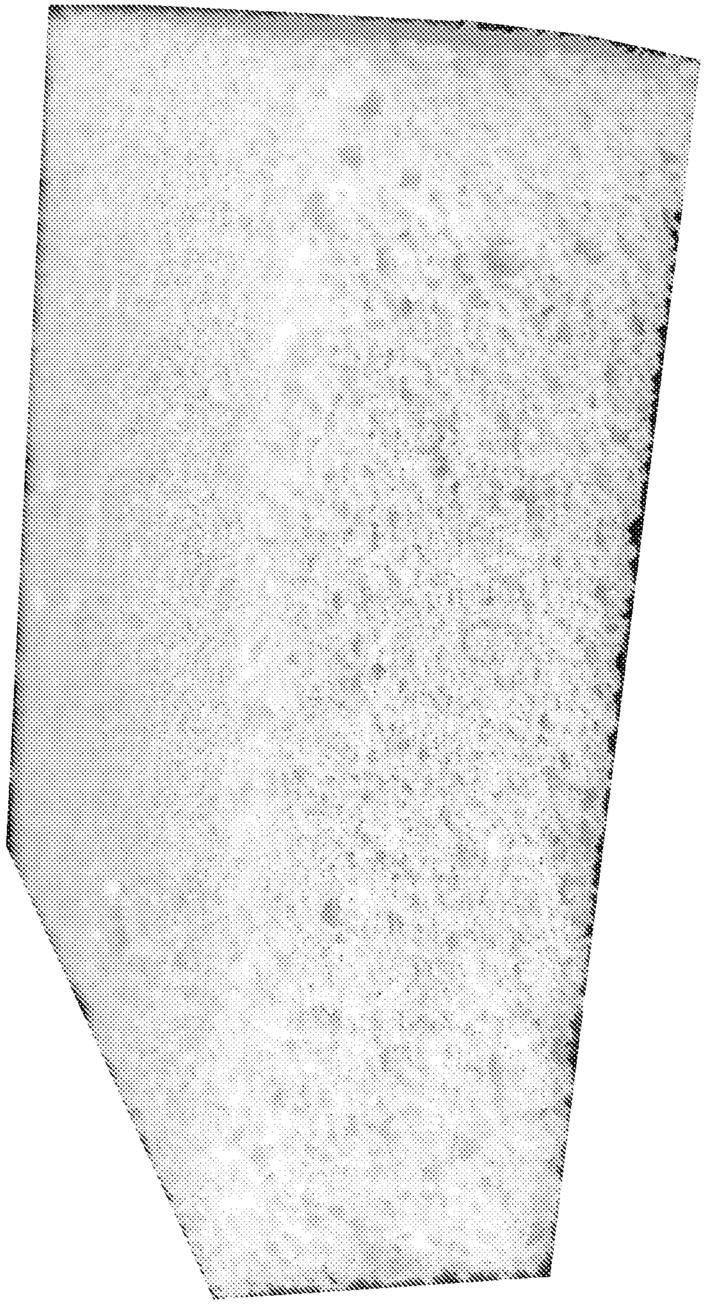
FIG. 2 illustrates an example of the foam in FIGS. 1A and 1B, in accordance with an embodiment of the disclosure.

FIG. 2 illustrates a foam sample 203, in accordance with an embodiment of the disclosure. Foam material 203 is a composite (e.g., a material made from two or more constituent materials) that includes a matrix with a polymer (e.g., chitosan) including monomer units of D-glucosamine and N-acetyl-D-glucosamine. In the depicted embodiment, the polymer may include 70% or less N-acetyl-D-glucosamine; however in other embodiments, the polymer may include 60% or less N-acetyl-D-glucosamine, 50% or less N-acetyl-D-glucosamine; 40% or less N-acetyl-D-glucosamine, 30% or less N-acetyl-D-glucosamine, 20% or less N-acetyl-D-glucosamine, or 10% or less N-acetyl-D-glucosamine. A dispersed phase may be disposed in the polymer matrix, and the dispersed phase and the polymer matrix form porous composite foam 203. In the depicted embodiment, porous composite foam 203 includes, a ratio of 0.5-3 of the dispersed phase weight to the polymer matrix weight and has a density of less than 1 g/cm3. For some composite foam embodiments, a ratio of about 0.5 to 2.5 of the dispersed phase weight to the polymer matrix weight is utilized. In general, the ratio should be at a level effective to maintain structural integrity of the composite foam 203. While in some embodiments, the polymer matrix includes chitosan, chitin and chitosan oligosaccharide may also be used as a polymer in the polymer matrix, in accordance with the teachings of the present disclosure.

In some embodiments, the dispersed phase includes at least one of chitin, starch, or cellulose. More specifically, examples of dispersed phases may include at least one of (unprocessed or minimally processed) shellfish shells, wood flour, hemp, paper pulp (e.g., including broken down recycled paper), coconut husks, cornstarch, or tapioca powder, or the like. It is appreciated that foam 203 depicted, has been made with all of the aforementioned dispersed phases, and that the dispersed phases are not mutually exclusive (the dispersed phases can be used individually and in combination), For example, all of the dispersed phases mentioned above may be combined in the same piece of composite foam 203, or only some of the dispersed phases may be included in the same piece of composite foam 203.

The discovery of adding a chitosan-compatible dispersed phase to the foam is a significant advancement in biodegradable foam technology because the properties of the foam can be tuned for a variety of applications, usable in some embodiments of laminated foam as describe herein. One can tune the pore size for example, by using a closed-mold during heating and changing the pressure inside the mold, By increasing the internal pressure, foams with smaller pore sizes can result. One can tune the density of the foam for example, by 1) changing the amount dispersed phase material and the amount of blowing agent (less dispersed phase material, more blowing agent, lower foam density), or 2) optimizing the internal pressure and temperature of the closed-mold (lower pressure, higher temperature, lower foam density). Indeed, the dispersed phases may enhance the mechanical properties of the foam by carrying part of applied loads (e.g., in tension, strain may be imparted to the dispersed phase—e.g., fibers—in the foam and not entirely carried by the polymer matrix). Furthermore, using biodegradable waste products, which may be locally sourced, reduces the cost of foam production. Dispersed phases may not totally dissolve in an acid solution, which may be used to make the foam, and may be distinct from the polymer matrix in the resultant foam (e.g., adhered to the polymer matrix but separate—not dissolved—in the polymer matrix).

In some embodiments, a nontoxic (e.g., safe for human consumption, safe for human skin contact, not generally regarded as carcinogenic, or the like) plasticizer may be disposed in the matrix material to impart a flexible character to the porous composite foam. Thus, organic composite foam sample 203 may be deformed (e.g., compressed, bent, stretched, or the like) and return to its original form without breaking. In some embodiments, the nontoxic plasticizer may include low molecular weight polymers, polyols, alcohols, or the like. In one embodiment, a polyol that is used as a plasticizer may be glycerol, and glycerol may be added from 0.0001 vol % to 50 vol % depending on the target foam flexibility. In one embodiment, a dye may be added to the polymer matrix, and the dye (e.g., food colorings or other nontoxic dyes) imparts a color (e.g., red, green, blue, yellow, orange, etc.) to the porous composite foam. It is appreciated that this color is not amenable to illustration due to the black and white nature of the drawings.

To produce the specific embodiment of foam sample 203 shown in FIG. 1, a solution of 0.5 M acetic acid (CH3COOH) was prepared with deionized water, Chitosan was dissolved in this solution at 4% w/v. The solution was stirred until the chitosan was fully (or partially) dissolved and clear. Corresponding amounts of starch (e.g., a dispersed phase; 0.1-0.2 wt ratio relative to chitosan dissolved in solution), chitin powder (e.g., a dispersed phase; 0.5-2.5 wt ratio relative to chitosan dissolved in solution), and sodium bicarbonate (NaHCCF) (0.5-1.5 wt ratio relative to the chitosan dissolved in solution) were added to the solution. The mixture underwent vigorous stirring. The mixture was then poured into a mold (which may be fully closed or open) and heated (in the mold) at 200-400° F. for 1-1.5 hr depending on the thickness of the final sample. In some embodiments, the mold may have heaters built into it. When heating was completed, the foam was transferred to a dehydrating oven to remove remaining moisture. The mixture then was placed into a vacuum chamber for 12 hrs. After vacuum, the foam was transferred to a drying container and underwent a 24-hr air-dry. In this particular embodiment, the recited range of dispersed phases may be critical to form a foam precursor that is not too viscous to work with and not so watery as to collapse when drying.

With this method, the resulting foam is fully dried. In this specific embodiment, the foam has a density that can be tuned between 0.1-0.8 g/cm3 with varied pore size and porosity. This foam includes chitin and a residual amount of sodium acetate (NaC2H3O2) and starch, all of which are nontoxic, biodegradable, and compostable. In other embodiments, other salts (e.g., not sodium acetate) may be left in the foam. As shown on the left, the cross-section of the foam reveals a uniform cellular structure. In the depicted embodiment, the average pore size can be tuned from 200 μm-800 μm. In some embodiments, the matrix polymer may be substantially chitosan (e.g., chitosan with some impurities), >90% chitosan, >80% chitosan, >70% chitosan, >60% chitosan, >50% chitosan, or the like depending on the desired mechanical properties and purity of chitosan used as a source for the foam.

Figure 3:
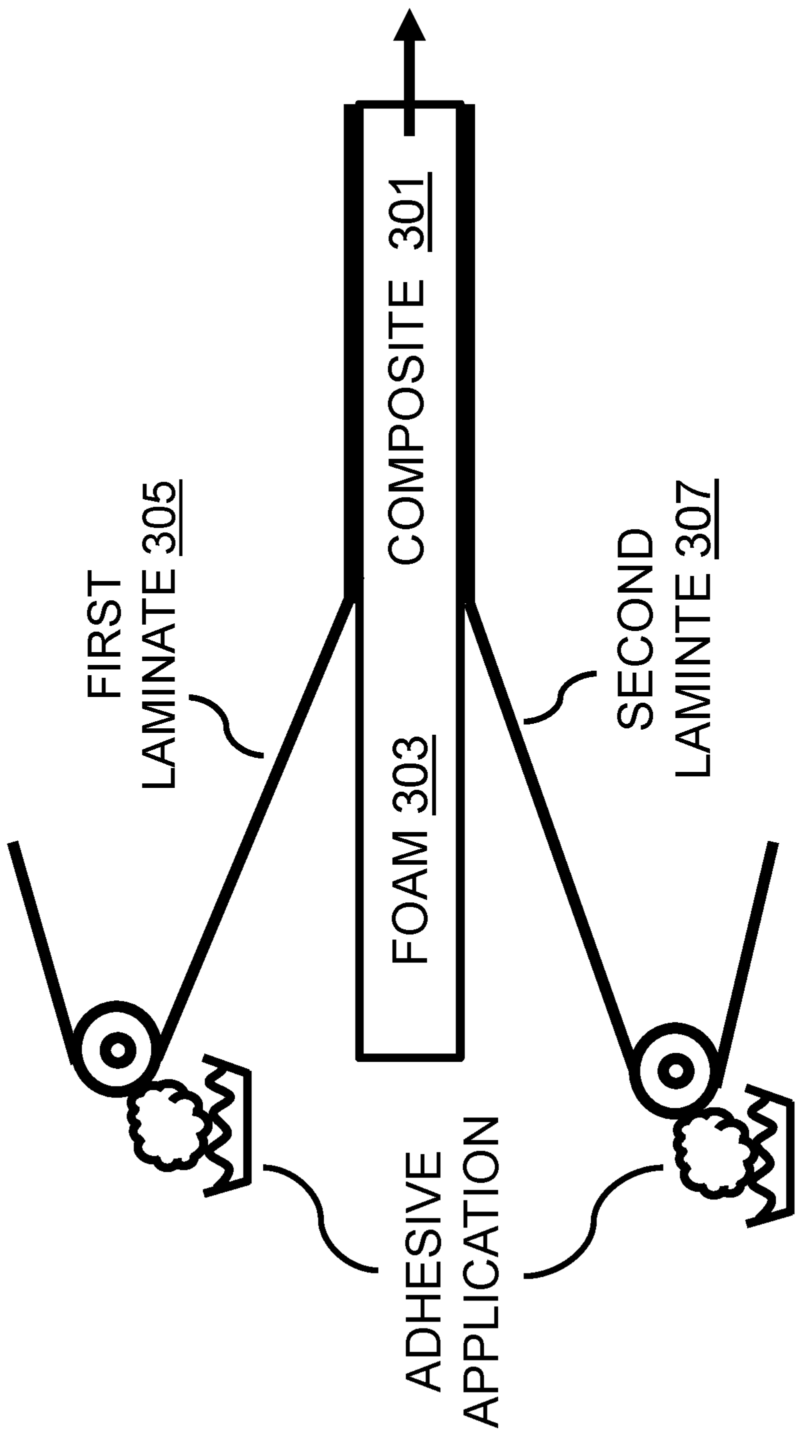
FIG. 3 illustrates a corrugator machine producing the composite material of FIGS. 1A and 1B, in accordance with an embodiment of the disclosure.

FIG. 3 illustrates a corrugator machine producing composite material 301 composite 101A of FIG. 1A), in accordance with an embodiment of the disclosure. Composite 301 manufacturing may be adapted into corrugator machinery by substituting each component in corrugator machinery for the components needed to fabricate the laminated composite 301.

In the depicted embodiment, first laminate 305 and second laminate 307 are being applied to both sides of a sheet of foam 303, as it is being pulled or pushed through corrugator-like machinery. Adhesive is applied continuously to first laminate 305 and second laminate 307 (with rollers, sponges, or the like, from adhesive reservoirs), to the surface of laminates 305/307 between foam 303 and laminates 305/307. This way, there is continuous throughput of composite 301. Accordingly, foam 301 may be produced via extrusion (see e.g., FIG. 9) and passed directly into the corrugator type equipment. Thus, composite 301 may be continuously produced, reducing cost of the final product and providing cost-effective biodegradable packaging.

Composite 301 may be a sheet (e.g., a meter or more wide, and several millimeters to tens of centimeters thick), which can further be folded into a tray or a box (see e.g., FIG. 10A). The final Composite 301 may include the center foam 303 fully encapsulated into the two-sided laminate (e.g., laminates 305 and 307) with edges covered. However, in other embodiments, only one side of foam 303 may be covered with the laminate, or the edges may be covered or uncovered.

Figure 4:
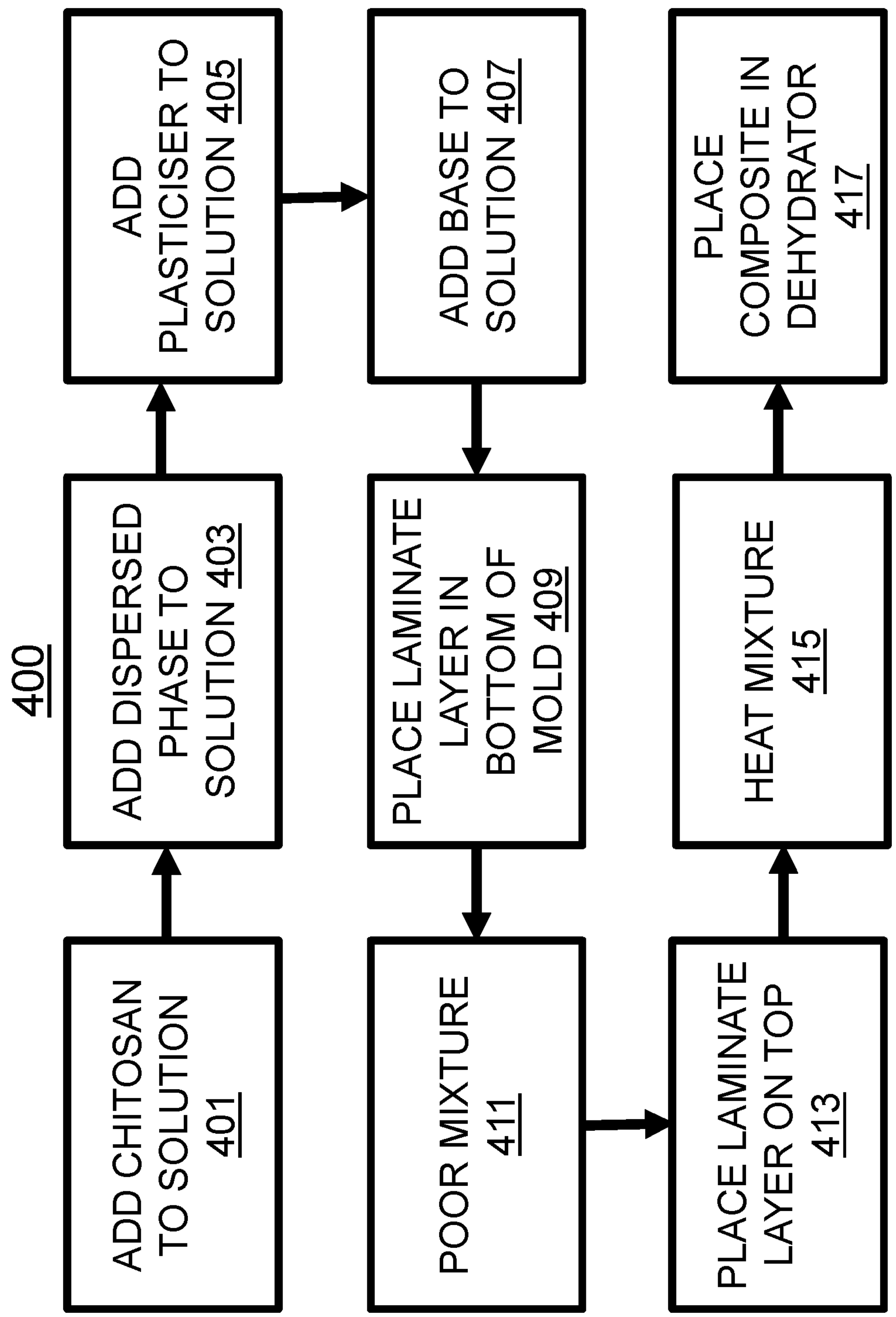
FIG. 4 illustrates a method of producing the composite material of FIGS. 1A and 1B, in accordance with an embodiment of the disclosure.

FIG. 4 illustrates method 400 of producing the composite material of FIGS. 1A and 1B, in accordance with an embodiment of the disclosure. One of ordinary skill in the art having the benefit of the present disclosure will appreciate that the blocks depicted (e.g., blocks 401-417) may occur in any order and even in parallel. Moreover, blocks may be added to, or removed from, method 400 in accordance with the teachings of the present disclosure.

Block 401 depicts adding chitosan to a solution of acetic acid and water (pH 3-6). In one embodiment, the chitosan may be dissolved in 0.5 M acetic acid (CH3COOH) solution at a concentration of 4% weight percent by volume (wt/v).

Block 403 shows adding the dispersed phase to the acid solution. As described above, the dispersed phase may include at least one of chitin, cellulose, or starch.

Block 405 illustrates adding plasticizer to the solution. In some embodiments, the plasticizer may include a polyol.

Block 407 depicts adding base to the acid the solution. In some embodiments, this may fill the foam with gas and also create a salt disposed within the foam.

Block 409 describes placing a laminate layer (e.g., laminate layer 105 from FIG. 1A) in the bottom of a mold (e.g., a metal recess like a pan or tray).

Block 411 illustrates pouring the mixture (e.g., the acetic acid solution with the chitosan, dispersed phase, plasticizer, and base) into the mold. In this batch process, the foam is adhered to the laminate by virtue of the foam being in its liquid form when it comes in contact with the laminate. Thus, there is no additional adhesive necessary to form the composite laminate material.

Block 413 depicts placing a laminate layer (e.g., laminate layer 107 from FIG. 1A) on top of the poured mixture in the mold. This places the liquid foam between two laminate layers.

Block 415 shows heating the mixture in the mold with the laminate layers disposed on either side of the mixture. This solidifies the foam and permanently adheres the foam to the laminate layers disposed on either side of the foam.

Block 417 illustrates placing the composite (e.g., composite material 101A from FIG. 1A) in a dehydrator to drive off excess water. In summary, laminate composite has been thrilled in a one-batch process by placing laminates on one or more sides of a mold, filling in the mold with a foam mixture, then completing the heating and drying process of the foam.

Figure 5:
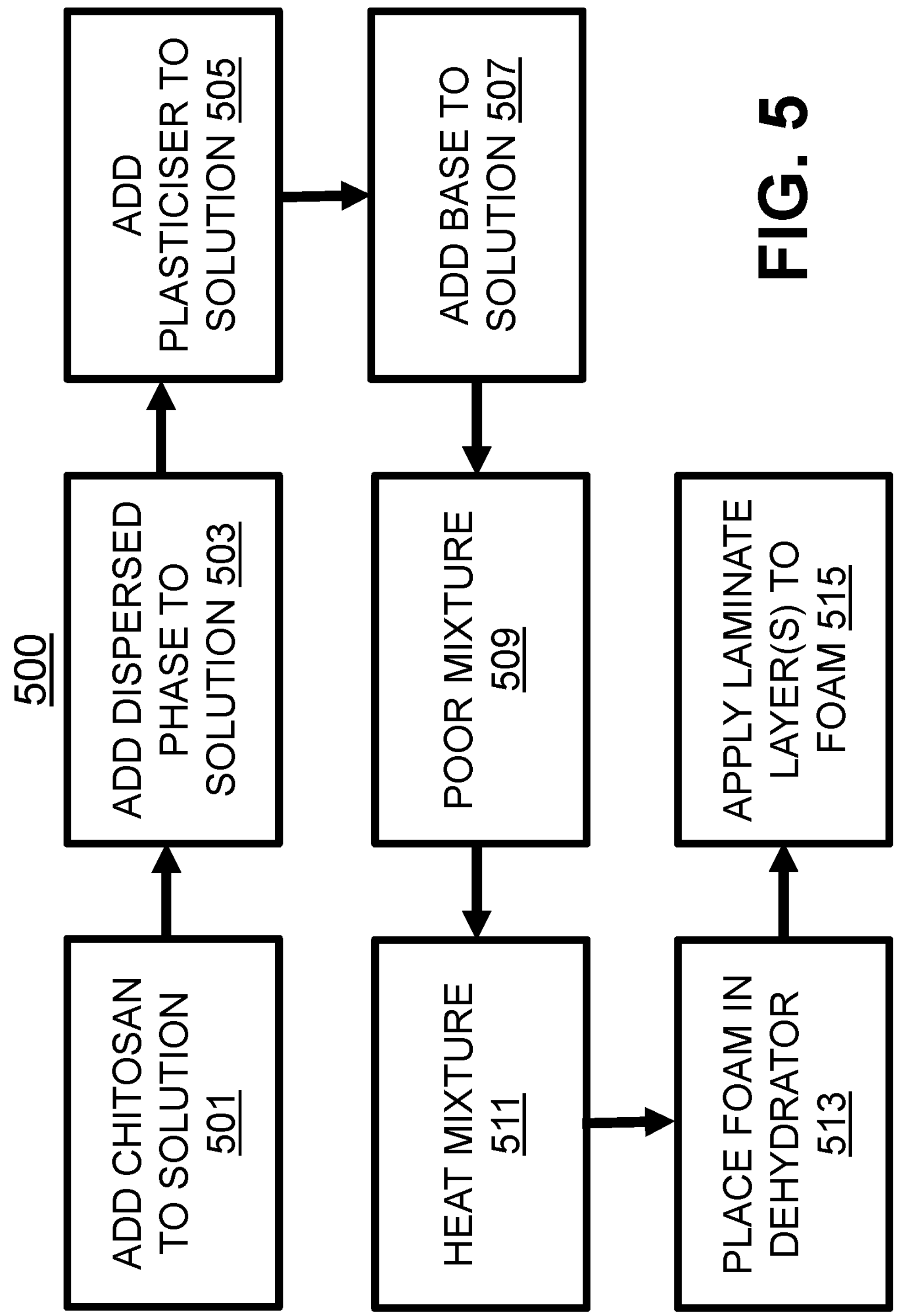
FIG. 5 illustrates a method of producing the composite material of FIGS. 1A and 1B, in accordance with an embodiment of the disclosure.

FIG. 5 illustrates a method of producing the composite material of FIGS. 1A and 1B, in accordance with an embodiment of the disclosure. One of ordinary skill in the art having the benefit of the present disclosure will appreciate that the blocks depicted (e.g., blocks 501-515) may occur in any order and even in parallel. Moreover, blocks may be added to, or removed from, method 500 in accordance with the teachings of the present disclosure.

Block 501 depicts adding chitosan to a solution of acetic acid and water (pH 3-6). In one embodiment, the chitosan may be dissolved in 0.5 M acetic acid (CH3COOH) solution at a concentration of 4% weight percent by volume (wt/v).

Block 503 shows adding the dispersed phase to the acid solution. As described above, the dispersed phase may include at least one of chitin, cellulose, or starch.

Block 505 illustrates adding plasticizer to the solution. In some embodiments, the plasticizer may include a polyol.

Block 507 depicts adding base to the acid the solution. In some embodiments, this may fill the foam with gas, and also create a salt disposed within the foam.

Block 509 depicts pouring the mixture into a mold (e.g., pan or tray), which will form the final shape of the foam.

Block 511 depicts heating the foam, in an oven or the like, to harden the foam.

Block 513 illustrates placing the foam in a dehydrator to remove fluid vapor from the foam.

Block 515 depicts applying laminates to the foam using adhesives or the like. Adhesives that may be used include chitin/chitosan solution, wood glue, or other biocompatible glue.

Figure 6:
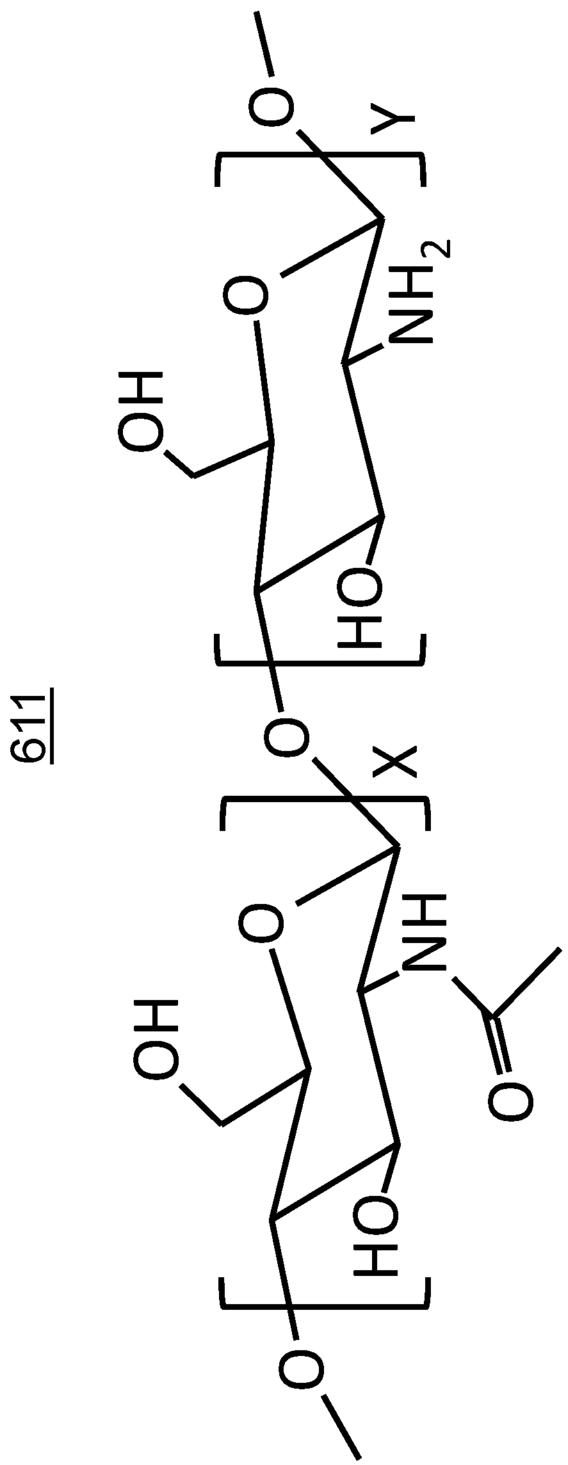
FIG. 6 illustrates the chemical structure of chitin and chitosan, in accordance with an embodiment of the disclosure.

FIG. 6 illustrates the chemical structure 611 of a polymer (which may be used in the foam of FIG. 2) that can be characterized as chitin or as chitosan depending on the relative amounts of blocks X (with acetyl group) and block Y (with amine group) in the chain, in accordance with an embodiment of the disclosure. Deacetylation replaces the N-acetyl-glucosamine group in chitin (X block) with an N-glucosamine (Y block) resulting in a more hydrophilic and positively charged polymer, which can be described as partially deacetylated chitin. Alternatively, acetylation of chitosan can yield a partially acetylated chitosan. When the ratio between acetyl and amine groups is higher than 1:1 ($x>y$; greater than a 50%/50% split of the two monomer units), the partially deacetylated chitin polymer may be referred to as chitin, when the ratio is lower, the partially acetylated chitosan polymer may be referred to as chitosan. Put another way, chitosan has 50% or more N-glucosamine groups, whereas chitin has more than 50% N-acetyl-glucosamine groups. The relative concentrations of the acetyl and amine groups in a polymer can be measure for example using techniques described in Shigemasa, et al, "Evaluation of different absorbance ratios from infrared spectroscopy for analyzing the degree of deacetylation in chitin," International Journal of Biological Macromolecules 18 (1996) 237-242, which is incorporated by reference as if fully set forth herein.

Both of these polymers may be derived from marine invertebrate shells (e.g., shrimp, lobster, and crab shells), are biodegradable, nontoxic, and structurally robust. While chitosan may form the polymer matrix of the foam (e.g., the foam depicted in FIG. 2), chitin may be used for the dispersed phase, as well as other materials, such as naturally occurring waste materials (e.g., paper pulp). One of ordinary skill in the art having the benefit of the present disclosure will appreciate that the chemical requirements for the chitosan matrix material may be more stringent than the material requirements for dispersed phase which may be any biodegradable product (e.g., shellfish shells, wood flour, paper pulp, cornstarch, coconut husks, wood/paper pulp, tapioca powder, etc.) that is capable of being integrated into the chitosan matrix to form the composite.

Through experimentation it has been shown that processing of chitosan and chitin is very different, and the use of chitosan in the foam process results in different structures with different material properties than foams with a chitin matrix. For example, the solubility of chitin and chitosan in solvents is dissimilar, and accordingly, procedures for foaming, adding a dispersed phase, and heating/hardening are very different. Thus, the final chitosan foam is distinct from foams made from chitin, and the processes used to make the chitosan-based foam may not be applicable to making chitin foams. Similarly, processes to make chitin foams may not be applicable to making the foam disclosed herein.

Figure 7:
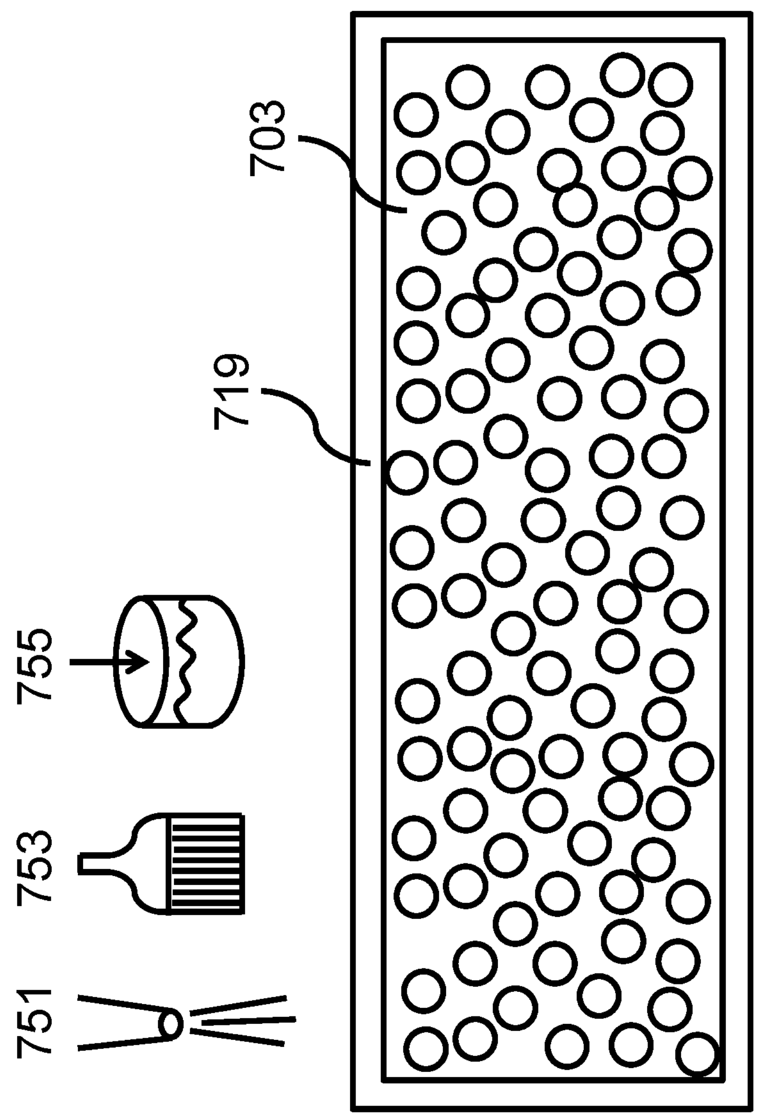
FIG. 7 illustrates a coating on the organic composite foam of FIG. 2, in accordance with an embodiment of the disclosure.

FIG. 7 illustrates a coating 719 on the organic composite foam 703 (e.g., foam 203 of FIG. 2), in accordance with an embodiment of the disclosure. In some embodiments, coating 719 may be applied to both the laminates (e.g., laminates 105/107 from FIG. 1A) and foam 703. The laminates may be fibrous paper or natural fiber textiles in some embodiments.

In the depicted cross section, coating 719 is disposed on the exterior of porous (illustrated circles represent pores) composite foam 703, and the coating is substantially non-porous (e.g., it doesn't contain macro-sized holes for water to travel through; however, the coating still may be micro-porous or nano-porous).

In some embodiments, coating 719 may be applied to foam 703, by spray coating (see nozzle 751), brushing (see e.g., brush 753), dip coating (see e.g., bath 755), etc. In one embodiment, a substantially deacetylated chitin or chitosan solution (e.g., 1-4 wt % in 4% w/v acetic acid solution) is applied to all surfaces. After applying, the sample is dried in a dehydrator or oven. One of ordinary skill in the art having the benefit of the present disclosure will appreciate that the chitosan coating improves the durability of the foam in humid conditions, and also gives the foam a smooth surface finish. More specifically, coating 719 encapsulates porous composite foam 301 to prevent water ingression into porous composite foam 703. It is appreciated that in the depicted embodiment, coating 719 includes the same chemical composition (i.e. chitosan) as the polymer in the polymer matrix of foam 703. However, in other embodiments, other polymer coatings 719 (e.g., polylactic acid, polyglycolide, or the like) may be applied to foam 703.

Figure 8:
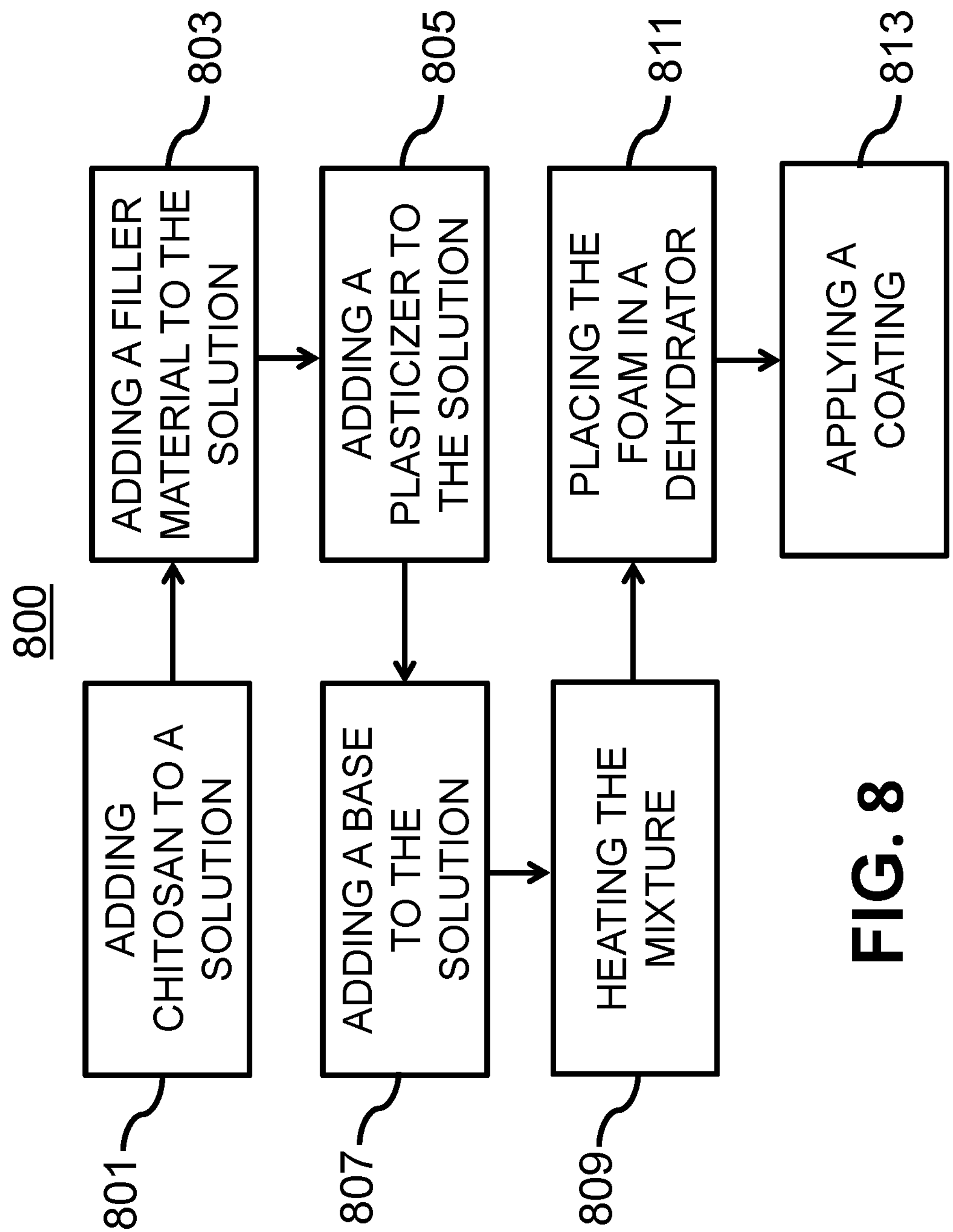
FIG. 8 illustrates a method of making foam, in accordance with an embodiment of the disclosure.

FIG. 8 illustrates a method 800 of making foam, in accordance with an embodiment of the disclosure. One of ordinary skill in the art having the benefit of the present disclosure will appreciate that the blocks depicted (e.g., blocks 801-813) may occur in any order and even in parallel. Moreover, blocks may be added to, or removed from, method 800 in accordance with the teachings of the present disclosure.

Block 801 illustrates adding chitosan to a solution, and the solution includes acid. In some embodiments, the solution including the acid has a pH of 3-6 (prior to adding the base). In some embodiments, it may be preferable to keep the pH at around 4.6 (a general range of pH 4-5)—this is advantageous over processes involving extreme pH ranges (which may use bases like sodium hydroxide or potassium hydroxide) since the processes here are much safer (no risk of burns and dangerous spills). The pH ranges recited here may be important in order to folly dissolve the chitosan. In one embodiment, the chitosan is dissolved in 0.5 M acetic acid ($CH_3COOH$) solution at a concentration of 4% wt/v. However, in some embodiments, the acid may include at least one of acetic acid, formic acid, lactic acid, hydrochloric acid, nitric acid, sulfuric acid, or the like. In one embodiment, the solution may include water, a cosolvent (e.g., ethanol, methanol, etc.) with a lower boiling point than the water, and the acid. The low boiling point cosolvent may help reduce the time to dry the foam, since the solvent carrying the foam materials evaporates faster and at lower temperatures.

Block 803 depicts adding a dispersed phase (e.g., a phase that is composed of particles that are distributed in another phase e.g., the polymer matrix) to the solution. In some embodiments, the dispersed phase includes at least one of chitin, cellulose, or starch. More specifically, the dispersed phase may include at least one of shellfish shells (e.g., minimally processed chitin), wood flour, paper pulp, hemp, coconut husks, corn starch, and/or tapioca powder. In some embodiments, a chitin dispersed phase is added to the mixture (e.g., 0.5-2.5 wt ratio against chitosan dissolved in solution). In some embodiments the foam may not include the dispersed phase.

Block 805 shows adding a nontoxic plasticizer to the solution, where the nontoxic plasticizer imparts a flexible character to the foam. In some embodiments, the nontoxic plasticizer includes a polyol or low molecular weight polymer (e.g., polyethylene glycol, or the like). Glycerol is a polyol with three hydroxyl groups. It is a nontoxic compound that enhances water absorption. In some embodiments, glycerol may be used as a plasticizer that is added to the chitosan-based foam formula to improve chitosan foam flexibility. The use of the plasticizer makes the foam more resistant to degradation from forces that stretch or compress the foam. When the initial deacetylated chitin (chitosan) solution in acetic acid is measured (e.g., 4% wt/v chitin in acetic acid solution), a volume percentage of glycerol (e.g., from 0.0001 vol % to 50 vol % of glycerol) can be added depending on the target foam flexibility. In some embodiments, depending on the specific formula for the amount of chitosan/glycerol in the mixture, the resulting foam may have a density ranging from 0.03 g/cc to 0.3 g/cc. The foam may be less rigid than chitosan foams made without glycerol and has a flexibility property similar to flexible polyurethane and expanded polypropylene, without any of the negative environmental drawbacks. However, as stated above, other plasticizers, preferably nontoxic, (e.g., other than glycerol) may be used in accordance with the teachings of the present disclosure. It is appreciated that many conventional plasticizers may be endocrine disrupters and may leach from their host plastics. The plasticizers here can be nontoxic, so this is not a problem.

The foam can be used in applications such as surfboards, and packaging (e.g., coolers). The plasticized foam is compressible and can, in some embodiments, be elastic returning substantially to its original shape after compression. In some embodiments, after compression to a thickness on the order of 50% of an original thickness, the foam can return to greater than 90% of its original thickness. Additionally, a coating layer may be applied to the foam, by brushing/spraying/etc., a deacetylated chitin (chitosan) solution (1-4 wt % in 4% wt/acetic acid solution, or 0.5 M acetic acid) on all surfaces, and drying in a dehydrator. The chitosan coating improves the durability of the foam in humid condition, and also gives the foam a smooth surface finish.

Block 807 illustrates adding a base to the solution (after the chitosan and the dispersed phase is added to the solution) to foam the mixture (which includes the chitosan and the dispersed phase). The base will react with the acid in the solution to produce gasses and foam the mixture. In some embodiments, the base includes at least one of sodium bicarbonate, sodium carbonate, or calcium carbonate. Thus, a salt may result in the foam from the reacted acid and base. In some embodiments, the salt may include a sodium or a calcium salt (e.g., sodium acetate, calcium acetate, or the like). However, one of skill in the art having the benefit of the present disclosure will appreciate that the salt may be any resultant salt from the acid/base combination used to prepare the foam (e.g., any salts that result from mixing the example bases and example acids disclosed herein). In one embodiment, sodium bicarbonate (1:1 mol ratio against acetic acid in the solvent system) may be used as the blowing agent and to neutralize the acid in the mixture—no need to wash the foam since the blowing agent neutralizes the acid, thus reducing processing steps and cost. However, one of skill in the art having the benefit of the present disclosure will appreciate that other bases or foaming agents (e.g., any chemical system to produce gasses in the mixture) may be used in accordance with the teachings of the present disclosure.

Block 809 depicts heating the mixture, after adding the base, until the mixture has hardened into the foam. Heating may occur after vigorous mixing of the aforementioned ingredients. In some embodiments, the heating process may include heating the mixture in a closed or open mold. In one embodiment, the foam is heated at a constant temperature—depending on the size of the mold and the end application of the foam, the temperature may range from 180 F to 400 F. The mold is heated until the foam is set and hardened (e.g., depending on the size of the mold and heating temperature, this heating time may range from 10 min to 3 hours).

Block 811 shows placing the foam in a dehydrator to remove water from the foam. The dehydrator may be heated and may even pull vacuum on the foam. The foam may be placed in the dehydrator overnight to allow water to fully evaporate.

Block 813 depicts applying a coating to the foam. The coating layer may be applied to the foam, by brushing/spraying/dipping/etc. with a deacetylated chitin (chitosan) solution (1-4% wt/v in 0.5 M acetic acid solution) on all surfaces and drying in dehydrator.

Figure 9:
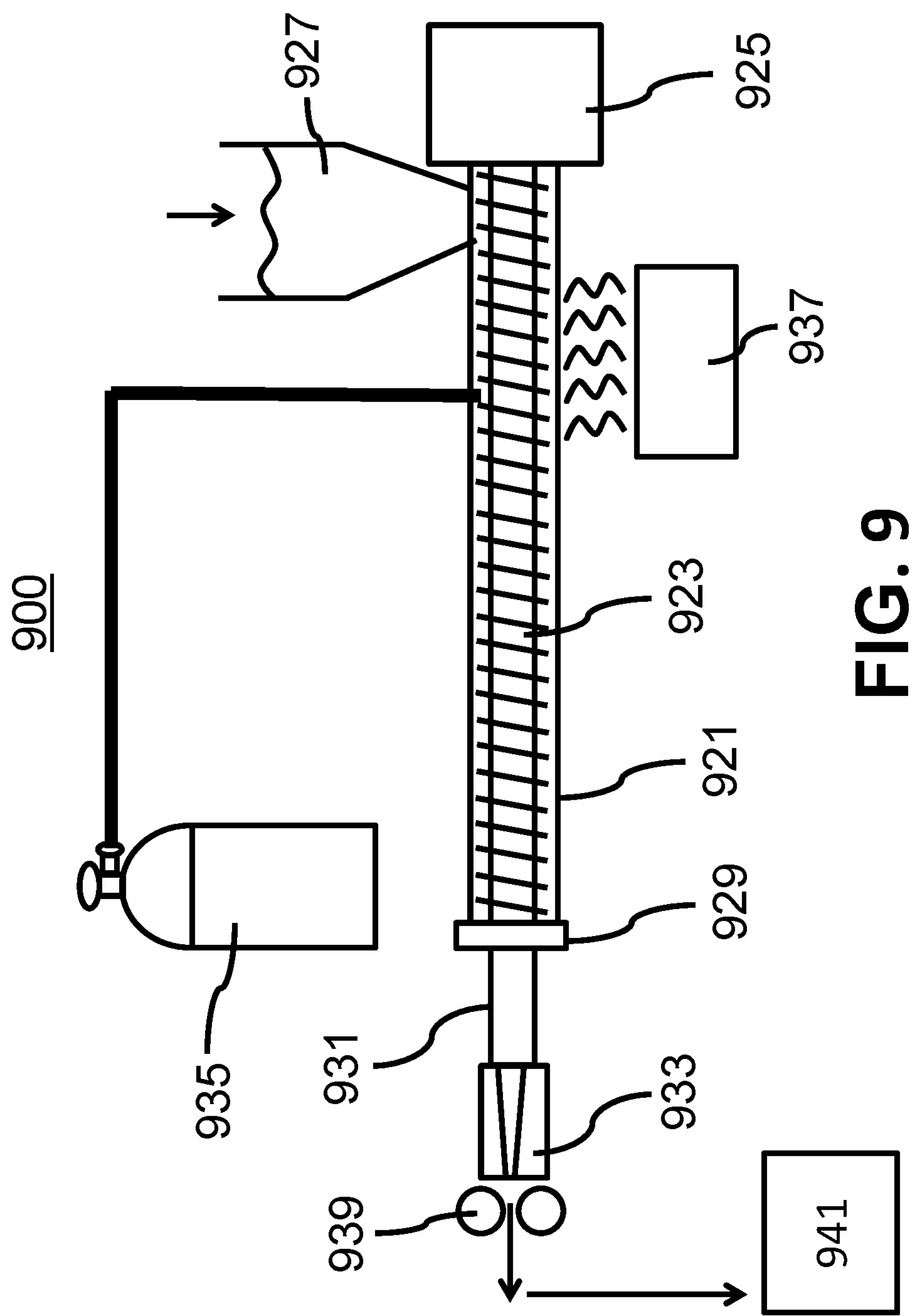
FIG. 9 illustrates a foam extrusion system and method, in accordance with an embodiment of the disclosure.

FIG. 9 illustrates a foam extrusion system 900 and method, in accordance with an embodiment of the disclosure. Foam extrusion system 900 includes barrel 921, screw 923, drive motor 925, input 927 (e.g., input for the mixture; depicted here as a "hopper"), breaker plate 929, feed pipe 931, die 933, foaming agent(s) in cylinder 935, heating unit 937, puller 939, and dehydrator 941. As illustrated a mixture is provided (in input 927) and the mixture includes a polymer, acid, filler material, and water. The polymer may include monomer units of D-glucosamine and N-acetyl-D-glucosamine, with 70% or less N-acetyl-D-glucosamine monomer units. In some embodiments, the mixture further includes a plasticizer (preferably nontoxic e.g., a polyol like glycerol) to impart a flexible character and in some embodiments an elastic character, to the porous composite foam. Similarly, in one or more embodiments, the dispersed phase includes at least one of chitin, cellulose, or starch (e.g., at least one of shellfish shells, wood flour, paper pulp, corn starch, coconut husks, tapioca powder, or the like). As will be discussed in greater detail later, in some embodiments, the mixture further includes an alcohol (e.g., ethanol, methanol, butanol, or the like). As shown, the mixture is inserted into the input 927 of the extrusion system 900, where it is fed into barrel 921. Extrusion system 900 pushes the mixture through one or more barrels 921—only one barrel 921 is depicted here, but one of skill in the art having the benefit of the present disclosure will appreciate that additional barrels may be coupled in series in accordance with the teachings of the present disclosure—with one or more screws 923 disposed in one or more barrels 921. As shown, the one or more screws 923 are coupled to one or more motors 925 to turn one or more screws 923, which push the mixture forward.

In the depicted embodiment, a foaming agent (e.g., contained in cylinder 935) is input (via a foaming agent input pipe) into extrusion system 900 to be received by the mixture, and foam the dispersed phase and the polymer matrix into the porous composite foam. In some embodiments, the foaming agent includes at least one of sodium bicarbonate, sodium carbonate, calcium carbonate, or carbon dioxide. In the depicted embodiment, heating unit 937 applies heat (depicted as wavy lines above heating unit 937) proximate to the input of extrusion system 900. Thus, the temperature and pressure of the mixture proximate to input 927 extrusion system 900 is higher than the temperature and the pressure proximate to the output (located by puller 939) of extrusion system 900.

Once the foam reaches the end of extrusion system 900, a shape of the porous composite foam is output from die 933. The shape has a fixed cross-sectional profile (e.g., circular, square, rectangular, hexagonal, or the like). Puller 939 is positioned to receive the foam from die 933 and keep a constant tension on the foam being removed from the system. Tension may be achieved by having the rollers of puller 939 being engaged by a motor to turn the rollers and pull the foam from die 933. Dehydrator 941 may receive the foam, and dehydrator 941 may heat the foam or pull vacuum (e.g., reduce the pressure) on the foam to remove excess solvent.

As stated above, in some embodiments, ethanol may be introduced as a cosolvent, and can facilitate vapor evaporation of solvent for an extrusion-based foam manufacturing process. Ethanol is added into water at a volume fraction of 1%-90% (VEtOH:VH20=1:99-1:9). Then, acetic acid may be added to the mixture, to keep the pH at around 4.6 (a general range of pH 4-5), which allows deacetylated chitin (chitosan) (1-10% w/v) to dissolve in this solvent system. Then the chitin (or other) dispersed phase is added to the mixture (e.g., 0.5-2.5 wt ratio against chitosan dissolved in solution) along with sodium bicarbonate (1:1 mol ratio against acetic acid in the solvent system) as the blowing agent to neutralize the acid in the mixture. Due to the evaporative nature (e.g., lower boiling point than water) of ethanol, this foam mixture has higher viscosity, and can go through a heated extruding pipeline with controlled flow rates for an extrusion process. After the foam is extruded out of the extruder, it hardens quickly, and forms a foam block. This block may then be left overnight for a curing process which allows the excess solvent to evaporate. Ethanol is a feasible choice here as a cosolvent with water since it is miscible with water and acetic acid. This formula facilitates vapor evaporation during foam manufacturing and will increase the production turnaround. Also, due to the decreased volume of water in the initial mixture, the cellular structure of the foam can be improved due to the reduced amount of water vapor evaporation, which leads to enhanced process controllability.

To summarize one embodiment, a highly viscous dough-like mixture (e.g., including chitosan) may be made. Chitin or a combination of chitin/chitosan and paper pulp, corn starch, tapioca powder, coconut husks, wood flour, or any other dispersed phase may be added. The highly viscous dough like mixture is moved into extrusion system 900 at high temperature, and sodium bicarbonate (and/or other forming agents; e.g, CO2 may be added as needed via a nozzle) is input into extrusion system 900. The mixture is extruded at a high temperatures and/or high pressure from an appropriately shaped nozzle into atmospheric pressure (lower pressure) As a result, the extruded material will expand. The foam may then be cured (e.g., in dehydrator 941) at high/medium temperature as needed to remove excess water and other solvents.

Figure 10:
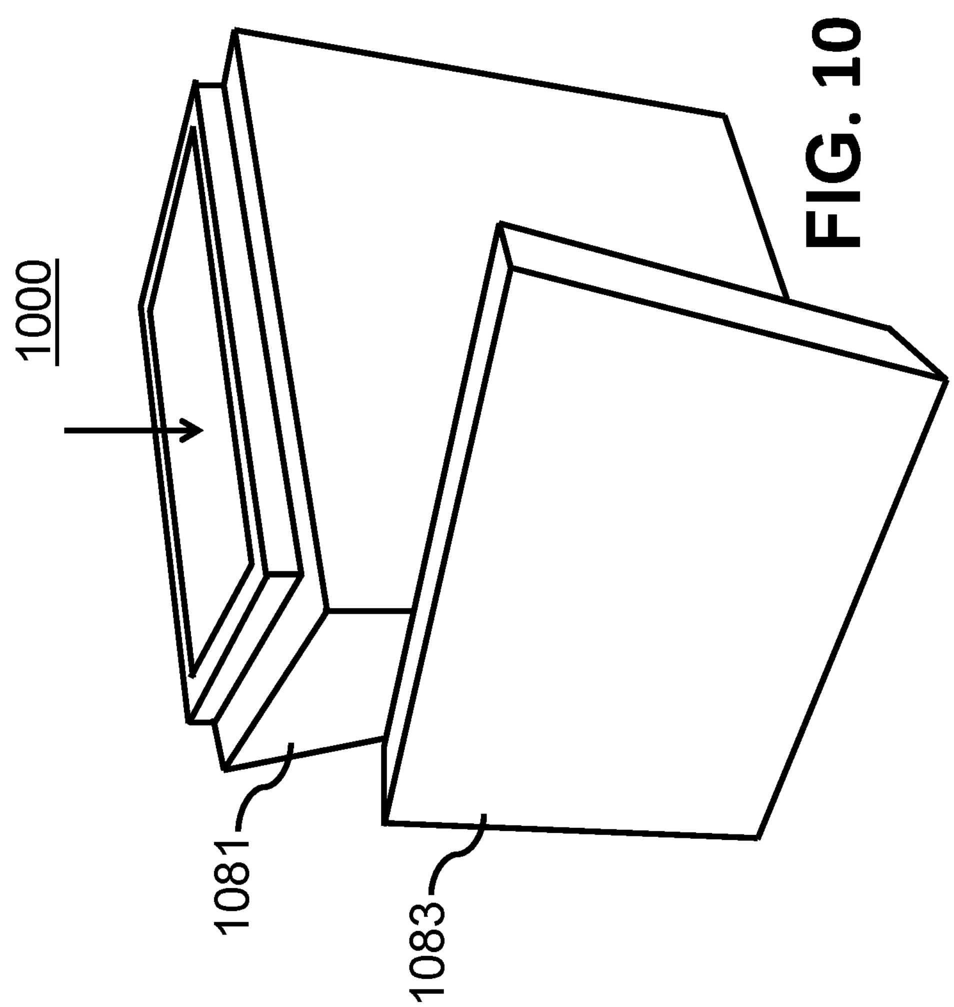
FIG. 10 illustrates a foam packaging system, in accordance with an embodiment of the disclosure.

FIG. 10 illustrates a foam packaging system 1000 (including body 1081 and lid 1083), in accordance with an embodiment of the disclosure. As shown, the porous composite foam (e.g., foam described in any of the aforementioned embodiments) is shaped to have five surfaces enclosing a recess (e.g., in body 1081) that is shaped to hold materials (e.g., frozen goods, case of cans, hot goods, etc.). In some embodiments, the five surfaces/sheets of foam may be considered connected at least in part; however, in other embodiments, the sheets may be disconnected (e.g held within in another container to form the recess). Lid 1083 may be made of the same foam as body 1081. In the depicted embodiment, pores of the porous composite foam are structured so the porous composite foam has an R factor (measurement of how well a material resists the flow of heat through it) of 3-5.5. Thus, the porous composite foam adequately insulates the interior of body 1081 when lid 1083 is placed on the body. In the depicted embodiment, lid 1083 has recesses to align with protrusions around the edge of body 1081, to align lid 1083 with body 1081 and hold lid 1083 in place. It is appreciated that the cooler-like foam packaging system 1000 may both be used to keep hot-goods hot, and cold-goods cold. Foam packaging system 1000 may be formed using any of the methods/techniques discussed above, and other methods, in accordance with the teachings of the present disclosure. Potential applications for this foam with insulating properties are cold chain packaging including fresh food delivery, pharmaceutical, electronics packaging, or the like. One or more surfaces of the system 1000 are laminated in embodiments of the present invention. In some embodiments, all exterior surfaces are laminated. In some embodiments, all interior surfaces are laminated. In some embodiments, the laminated surfaces are laminated using paper or natural fiber textiles and adhesive. In some embodiments, the laminated surfaces are laminated using a biodegradable laminate.

Figure 11:
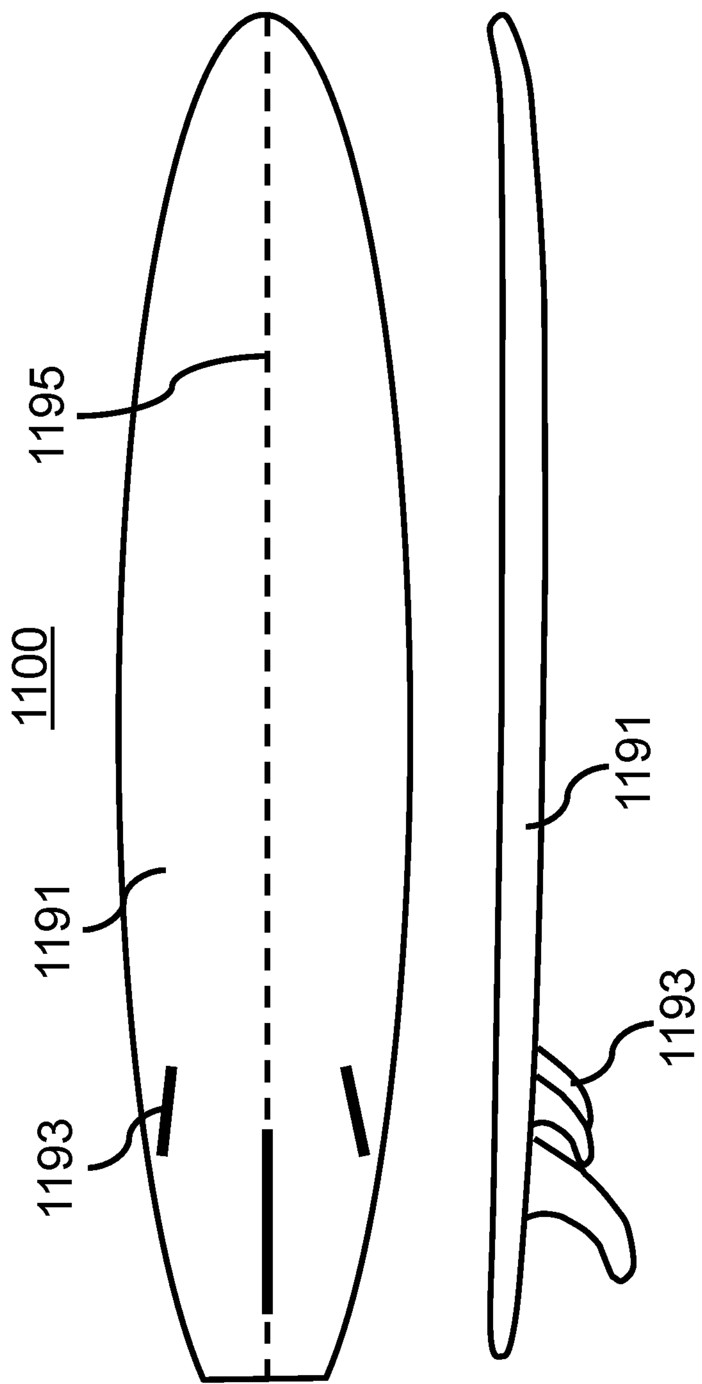
FIG. 11 illustrates a recreational water device, in accordance with an embodiment of the disclosure.

FIG. 11 shows a recreational water device 1100, in accordance with an embodiment of the disclosure, in which the composite laminate foam may be used. The depicted recreational water device 1100 is a surfboard or boogie board including body 1191, fins 1193, and stringer 1195. The top figure depicts a bottom-up view of recreational water device 1100 showing the location and orientation of the fins 1193, and the bottom figure depicts a side view of recreational water device 1100. As shown, body 1191 has a length that is longer than the width, and also has a back end and a front end where the front end is convex (to cut through the water when ridden by a user). The back end may be flat, convex "v" shaped (e.g., a "fish" hoard), or the like. Body 1191 includes a porous composite foam (e.g., foam described in any of the aforementioned embodiments) having a density of less than 1 g/cm3, and the porous composite foam includes a polymer matrix including monomer units of D-glucosamine and N-acetyl-D-glucosamine (the polymer matrix includes 50% or less N-acetyl-D-glucosamine) and a dispersed phase disposed in the polymer matrix (the dispersed phase and the polymer matrix form the porous composite foam). One or more surfaces of the system 1000 are laminated in embodiments of the present invention. In some embodiments, all exterior surfaces are laminated. In some embodiments all interior surfaces are laminated. In some embodiments, the laminated surfaces are laminated using paper or natural fiber textiles and adhesive. In some embodiments, the laminated surfaces are laminated using a biodegradable laminate.

In the depicted embodiment, stringer 1195 (e.g., a thin long piece of structural wood or other material) extends lengthwise through body 1191 with the porous composite foam disposed on either side of stringer 1195. A coating encases both the porous composite foam and stringer 1195. As shown, one or more fins may be disposed proximate to the backend, and positioned to direct the recreational water device through water. In the depicted embodiment, there is a central larger fin with two smaller fins offset and angled toward the center of body 1191. In other embodiments, there may be more or fewer fins, in accordance with the teachings of the present disclosure. As stated in connection with other embodiments described herein, the dispersed phase includes at least one of chitin, starch (e.g., a polymeric carbohydrate including many glucose units joined by glycosidic bonds), or cellulose, and the polymer matrix may include a nontoxic plasticizer to impart a flexible character, and in some embodiments, an elastic character, to the porous composite foam. As shown, the body may be shaped (when viewed from top down or bottom up) to be substantially ellipsoidal, and the front end of the board may taper slightly up (as shown in the side view).

FIG. 12 shows a table 1200 of measured biodegradable foam properties, in accordance with an embodiment of the disclosure. The properties are from foam samples produced in accordance with the teachings of the present disclosure. As depicted, in some embodiments, biodegradable foam produced without plasticizer has a density ranging from 0.15 g/cm3-0.23 g/cm3 and has a compressive strength range (10% deformation) of 0.2 Mpa and 0.48 Mpa, respectively. Additionally, the foam without plasticizer has an elastic modulus ranging from 4.230 Mpa-6.550 Mpa for less dense and more dense foam, respectively.

Biodegradable foam samples produced with plasticizer (e.g., glycerol) may have a 0.25 vol % of glycerol and 1 vol % glycerol, and a density of 0.20 g/cm3 and 0.27 g/cm3, respectively. The compressive strength of these samples may be 0.17 Mpa and 0.106 Mpa, respectively. And the elastic modulus of the two samples are 3.4 Mpa and 2.01 Mpa, respectively. The data in table 1200 demonstrates that foams with a wide range of material properties may be produced following the teachings of the present disclosure.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A composite material, comprising:

a porous foam, having a density of less than 1 g/$cm^3$, with a polymer matrix, wherein the polymer matrix includes chitosan or chitosan oligosaccharide;

a dispersed phase disposed in the polymer matrix, wherein the dispersed phase and the polymer matrix form the porous foam, and wherein the dispersed phase includes starch and chitin, and the porous foam is characterized as having a first weight ratio from 0.1 to 0.2 of the starch included in the dispersed phase relative to the chitosan or the chitosan oligosaccharide included in the polymer matrix, and wherein the porous foam is further characterized as having a second weight ratio from 0.5 to 2.5 of the chitin included in the dispersed phase relative to the chitosan or the chitosan oligosaccharide included in the polymer matrix; and a first laminate adhered to a first surface of the porous foam; and a coating layer, having a composition different from the porous foam, disposed between the porous foam and the first laminate to contact the porous foam and the first laminate and adhere the porous foam to the first laminate, wherein the coating layer includes at least one of chitin or chitosan.

2. The composite material of claim 1, further comprising:

a second laminate adhered to a second surface, opposite the first surface, of the porous foam so that the porous foam is disposed between the first laminate and the second laminate, and wherein the coating layer is substantially non-porous.

3. The composite material of claim 1, wherein the first laminate includes at least one of cellulose fiber, cloth, chitin, chitosan, or wax.

4. The composite material of claim 1, further comprising a plasticizer disposed in the porous foam.

5. The composite material of claim 4, wherein the plasticizer is nontoxic, and wherein the plasticizer is disposed in the polymer matrix of the porous foam.

6. The composite material of claim 5, wherein the plasticizer includes at least one a low molecular weight polymer, a polyol, or an alcohol.

7. The composite material of claim 1, wherein the porous foam is shaped to have five or more surfaces enclosing a recess.

8. The composite material of claim 1, wherein the dispersed phased is separate from the polymer matrix and not dissolved in the polymer matrix.

9. The composite material of claim 1, wherein the porous foam has an elastic modulus from 2.010 MPa to 6.550 MPa.

10. The composite material of claim 1, wherein the porous foam has a compressive strength, at 10% deformation, from 0.106 MPa to 0.480 MPa.

11. The composite material of claim 1, further comprising at least one of a sodium salt or a calcium salt disposed in the porous foam.

12. The composite material of claim 11, wherein the at least one of the sodium salt or the calcium salt disposed in the porous foam is sodium acetate, calcium acetate, sodium bicarbonate, sodium carbonate, or calcium carbonate.

13. The composite material of claim 1, wherein the density of the porous foam is from 0.1 $g/cm^3$ to 0.8 $g/cm^3$.

14. The composite material of claim 1, wherein the coating layer is formed with a 1-4 wt % chitosan solution.

15. The composite material of claim 1, wherein porous foam returns to greater than 90% of an original thickness after compression to 50% of the original thickness.

* * * * *